June 24, 1958
E. T. HANSHAW
2,839,862
SPEAR GUN
Filed Feb. 23, 1955
2 Sheets-Sheet 2
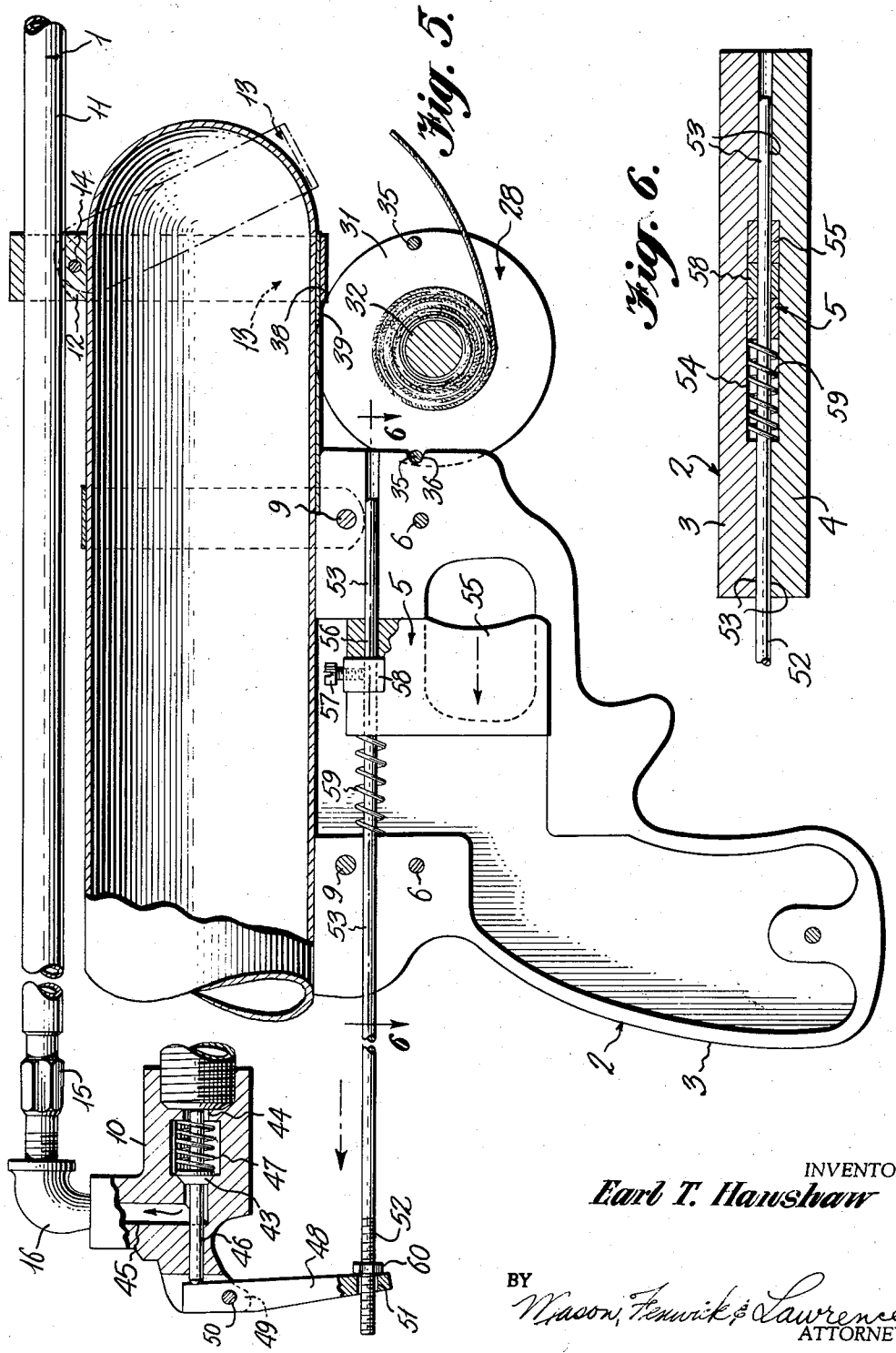
INVENTOR
Earl T. Hanshaw
BY Mason, Fenwick & Lawrence
ATTORNEYS United States Patent Office 2,839,862
Patented June 24, 1958

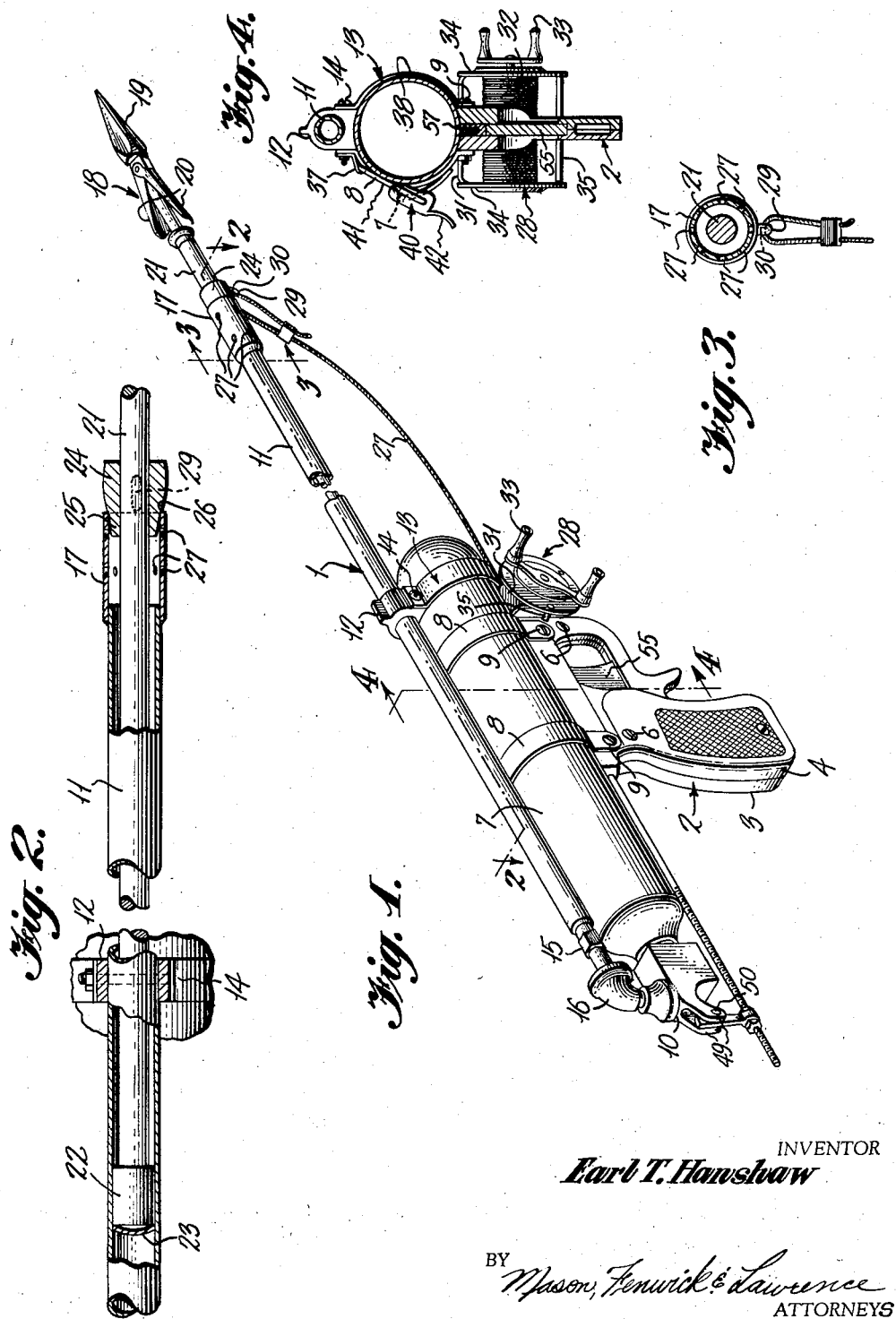

2,839,862
SPEAR GUN
Earl T. Hanshaw, Miami, Fla.
Application February 23, 1955, Serial No. 489,986
6 Claims. (Cl. 43—6)

This invention relates to pressure operated spear guns particularly adapted for underwater use.

Pressure operated spear guns are now used quite extensively for underwater spear fishing. They are operated usually by small cartridges which contain sufficient gas for a single use. It is frequently desired to reload and refire the gun underwater and with the known type of gun it is necessary to carry a supply of cartridges. This is not only a nuisance to the swimmer, but imposes an extra burden. Known guns also have other disadvantages in matters of proper balance and easy operation.

The object of the present invention is to provide a gun of this type which includes a gas cylinder, carrying sufficient charge to discharge the spear many times.

Another object of the invention is to provide a spear gun having a reel, as a part of the assembly with a line connected to the spear so that it may be retrieved readily, which reel is mounted upon the gun so that it can be instantly detached in emergency if the object speared becomes uncontrollable.

It is an object of the invention to provide an improved assembly of pistol grip, trigger mechanism, gas cylinder barrel and reel in a spear gun of the type mentioned.

Other objects of the invention will become apparent from the following description of a practical embodiment thereof, when taken in conjunction with the drawings which accompany, and form part of, this specification.

In the drawings:

Figure 1 is a prospective view of a spear gun embodying the principals of the present invention;

Figure 2 is a fragmentary horizontal section through portions of the gun barrel with a spear in place, and is taken on the line 2—2 of Figure 1;

Figure 3 is the vertical section taken on the line 3—3 of Figure 1;

Figure 4 is a transverse, vertical section through the gun, taken substantially on the line 4—4 of Figure 1;

Figure 5 is a partial vertical, longitudinal section through the pistol grip and associated parts, showing the trigger mechanism and, Figure 6 is a horizontal section through the pistol grip, and is taken on the line 6—6 of Figure 5.

In general, the invention consists of a spear gun having a pistol grip made in halves, or molded and cored in one piece, which is assembled along with a gas tank, barrel and reel to form a unitary structure, with a trigger mounted in the pistol grip for controlling the release of gas from the tank for ejecting the spear from the barrel. A reel is releasably mounted on the gun for holding a line connected to a spear.

Referring to the drawings in detail, there is shown a spear gun 1 having a pistol grip 2, formed of cast halves 3 and 4. The grip carries a trigger mechanism 5, to be described, and the halves of the grip are held together by screws 6.

A storage tank or cylinder 7, filled with gas, or other fluid under pressure, is carried by the pistol grip. Straps 8 are passed around the cylinder and have their ends bolted to the pistol grip. The ends of the straps are apertured and the bolts 9 are passed through them and the sections of the pistol grip to tighten the straps and secure the cylinder tightly against the top of the pistol grip. The bolts also serve to hold the halves of the pistol grip together. By using straps to secure the cylinder in place, the cylinder can be adjusted axially to change into position with respect to the pistol grip to balance the entire assembly. A valve block 10 is threaded, or otherwise fastened, to the rear end of the cylinder.

A barrel 11 is supported above the cylinder. It is carried intermediate its length in a barrel support block 12 which is attached to the gas cylinder by means of a clamp 13. The clamp comprises a curved strap which encircles the cylinder and has its ends apertured to receive a bolt 14 which passes through the block 12. The rear end of the barrel is welded onto the end of a fitting 15, which is screwed into an elbow 16 threaded into the valve-block 10. Thus communication is established from the cylinder to the barrel under control of a valve, to be desscribed, in the valve-block.

The outer end of the barrel is fitted with a perforated sleeve 17 which serves as a forward bearing support for the spear 18 and as a means for controlling the escape of water from the barrel. The spear has the usual pointed head 19, pivoted barbs 20, shaft 21 and piston 22, fixed to the end of the shaft and having a close sliding fit within the barrel. The spear fits into the barrel with the piston occupying a position near the rear end of the barrel. A paper wad 23 is usually put in ahead of the spear to improve the compression within the barrel.

A sliding bearing 24 is provided on the spear shaft which seats within the end of the perforated sleeve 17 and forms a guide for the spear as it is discharged. The bearing has a reduced inner portion 25, which fits within the sleeve, and frusto-conical section 26 between the reduced and large portions which seats in the mouth of the sleeve and limits inward movement of the bearing. When the spear is discharged, the shaft slides through the bearing until the piston strikes it, whereupon the bearing is pushed out of the sleeve and moves with the spear. The piston moving outwardly of the barrel will force water in the barrel out through the openings 27 in the sleeve 17. The number and size of the openings in the sleeve will determine the rate at which the water can be expelled, and the flow can be regulated so that the water will serve to cushion the impact of the piston on the bearing.

The bearing 24 forms a convenient member for attaching a line from a reel 28. The bearing has a loop 29 on its underside, forming an eye 30 to which an end of the line may be made fast.

The reel may be of any conventional form, and includes a housing 31, spool 32 and crank 33. The housing is composed of end members 34 connected by spacer rods 35. The reel is connected to the gun by seating one of the rods 35 in a notch 36 formed in the pistol grip and securing it by means of the strap 13 which holds the barrel to the cylinder 7.

The strap 13 is in two parts. One section 37 is quite short, and the other section 38 encircles the major portion of the cylinder and the forward extension of the reel base 39 to hold the reel base against the bottom wall of the cylinder. The rearward extending portion of the reel base slides between the top of the pistol grip and the bottom of the cylinder. The two sections of strap 13 are connected by means of a toggle 40. This may be any quickly releasable toggle, such as well-known "Corbin Catch" which is illustrated. The toggle comprises a loop or link 41, pivotally connected at one end to the short section 37 of the strap, and a lever or latching member 42 having one end pivotally connected to the end of strip section 38. The link and latching members are pivotally connected together. It will be understood that when the lever 42 is pulled down the ends of the strap will be pulled together, tightening the strap around the cylinder and binding the reel to the cylinder. The latching takes place when the pivotal connection between the link and lever passes over the pivotal connection between the lever and strap.

When a fish has been speared which is unmanageable it is simply necessary to flip up the lever of the toggle to release the reel from the gun. This will loosen the strap about the cylinder, and the pull on the reel will cause the reel and strap 13 to move forward, slipping the rear end of the base from between the pistol grip and cylinder, and forcing the strap 13 to swing about the end of the cylinder around its pivotal connection to the bearing block 12. This will free the reel.

As previously mentioned the discharge of the gun is controlled by a trigger mechanism 5 which when actuated opens a valve 43 in the valve block 10. The valve block is provided with a passageway 44 leading from the gas cylinder, and a passageway 45 in communication with the gun barrel. Valve 43 is located at the juncture of the two passageways.

Valve 43 is provided with a stem 46 and is moved from its seat by pushing the valve stem inwardly. The valve is held in normally seated position by means of a coiled spring 47 which bears against the valve head. The outer end of the valve stem is in contact with one end of a lever 48, which is in turn pivoted to ears 49 which project from the valve block. The pivot for the lever is shown at 50. The opposite end of the lever is bored, as at 51, and receives the end of an operating rod 52 which passes through openings 53 formed by arcuate recesses in the confronting faces of the halves of the pistol grips.

The two halves of the pistol grip are hollowed out to form a chamber 54 to receive the operating members of the trigger mechanisms. The trigger 55 slides in the chamber 54 and is bored, as at 56, to receive the operating rod 52. The trigger is recessed at the top to receive a block 58 which is fixed to the rod by means of a set screw 57. A spring 59, between the trigger and the pistol grip holds the trigger in its forward inoperative position. It will be obvious that rearward movement of the trigger will cause the valve to be withdrawn from its seat and permit gas in the cylinder to flow to the barrel and expel the spear. The rear end of the rod is threaded to receive a nut 60 which bears against the lever 48. The position of the nut can be changed to determine the opening of the valve.

It will be noticed that chamber 54 in the pistol grip is open through the top of the grip. This has many advantages. It permits insertion of the trigger from the top, when the grip is removed from the cylinder, and separation of the halves is unnecessary. This structure also makes it possible to cast the grip in one piece, if desired, the chamber and guide openings for the operating rod being cored out.

From the above description it will be apparent that an improved gun is provided wherein the pistol grip forms a base upon which all of the other parts of the structure are mounted. The gas cylinder seats upon, and is clamped to, the pistol grip and the cylinder in turn carries the gun barrel. The reel is fitted into the remainder of the assembly as the gas cylinder and barrel are connected. The particular mounting means employed permits ready adjustment of the pistol grip longitudinally of the assembly to obtain perfect balance under all conditions. Means are employed for guiding the spear until it leaves the gun, and to cushion the impact of the spear piston against the guiding means.

While in the above practical improvements of the invention have been disclosed, it will be understood that the specific details of structure described and illustrated are merely by way of example and the invention may take other forms within the scope of the appended claims.

What is claimed is:

1. A spear gun comprising a pistol grip vertically split to form two sections having their confronting surfaces hollowed out to form a chamber, a trigger within the chamber, a cylinder for storage of gas under pressure removably positioned on said pistol grip, straps surrounding said cylinder having their ends secured to said pistol grip by bolts which pass through the sections of the pistol grip to draw the sections together and clamp the pistol grip to the cylinder, a barrel above said cylinder and aligned parallel thereto, a strap encircling said cylinder and attached to said barrel to secure said barrel to to said cylinder, a valve block including a valve interposed between said cylinder and one end of said barrel, and means intercoupling said valve and said trigger to cause operation of said valve to release gas from said cylinder to said barrel when said trigger is actuated.

2. In a spear gun as claimed in claim 1, said pistol grip having a notch thereon, a reel having a base with a portion seating in said notch, said base fitting beneath the strap attaching said barrel to said cylinder, and a toggle in the strap connecting the barrel to the cylinder to releasably clamp said strap about said cylinder and said reel base.

3. In a spear gun, a gas cylinder horizontally disposed and having an outlet at the back end thereof, a barrel above and parallel to said cylinder, a pistol grip beneath said cylinder, a reel beneath said cylinder having a base seated against the bottom of said cylinder with one end between said pistol grip and said cylinder, said pistol grip being secured to said cylinder by straps encircling said cylinder and having their ends attached to said pistol grip by bolts, said barrel being secured to said cylinder by a block including a valve interconnected between the outlet of said cylinder and the back end of said barrel and a strap connected to said barrel and encircling said cylinder and about the end of said reel base remote from said pistol grip, a trigger in said pistol grip, and means horizontally adjustable interconnecting said trigger and said valve whereby said trigger controls operation of said valve.

4. In a gas operated spear gun including a gas cylinder and a barrel parallel to the cylinder with a pistol grip attached to the cylinder on the side opposite the barrel, the improvement comprising, a reel having a base, one end of said base being slidably seated between said pistol grip and said gas cylinder, a strap encircling the cylinder and the other end of the reel base, and a quick release toggle in said strap to draw up the strap to clamp the reel to the cylinder and to loosen the strap to quickly free the reel from attachment to the cylinder.

5. In a spear gun comprising, a pistol grip, a trigger within the pistol grip, a gas cylinder mounted on said pistol grip and having an outlet and a release valve in said outlet, a barrel mounted upon said cylinder and having one end connected to the outlet of said cylinder, and means intercoupling said trigger and the valve in said cylinder outlet to cause operation of said valve when said trigger is moved, said pistol grip having a notch therein, a reel having a portion seated in said notch and a base having one end slidably seated between said pistol grip and said cylinder, means clamping said barrel to said cylinder and engaging the opposite end of said base, and a toggle in said clamping means to releasably secure said clamping means about said base.

6. In a spear gun, a gas cylinder, a barrel mounted above the cylinder, a spear for insertion in said barrel to be fired therefrom, a bearing block seated upon said cylinder near the forward end thereof and apertured to receive said barrel, a two-part strap having one end of each part pivotally connected to said bearing block, a toggle interconnecting the opposite ends of said strap parts to releasably clamp the strap about the cylinder, a pistol grip secured beneath said cylinder, and a reel having a line thereon with one end fixed to the spear, said reel having a base with one end of the base slidably inserted between the cylinder and pistol grip and the other end beneath said strap, whereby said reel may be clamped against said cylinder for normal use of the gun and released from the gun by tripping the toggle when it is desired to disconnect the spear from the gun.

References Cited in the file of this patent

UNITED STATES PATENTS

| | | |
|---|---|---|
| 2,283,816 | Loutrel | May 19, 1942 |
| 2,505,428 | Pope | Apr. 25, 1950 |
| 2,642,056 | Harris | June 16, 1953 |
| 2,703,944 | Molyneux | Mar. 15, 1955 |
| 2,713,859 | Bradfield | July 26, 1955 |

FOREIGN PATENTS

| | | |
|---|---|---|
| 910,495 | France | June 7, 1946 |
| 926,863 | France | Oct. 14, 1947 |